Patented Apr. 6, 1937

2,076,144

UNITED STATES PATENT OFFICE 2,076,144

VAT DYES

Walter Hagge and Karl Haagen, Dessau in Anhalt, Germany, assignors to General Aniline Works, Inc., New York, N. Y., a corporation of Delaware No Drawing. Application January 3, 1936, Serial No. 57,365. In Germany January 12, 1935

7 Claims. (Cl. 260—17)

Our present invention relates to a process for manufacturing vat dyes and to the new products obtainable by this process.

By the present invention there are obtained from decacyclene valuable vat dyes by treating decacyclene successively or simultaneously with a sulfurizing agent and a halogenating agent in the presence of chloro-sulfonic acid; for example, by the action of sulfur, sulfur-chloride, or the like on decacyclene at a high temperature there is obtained a fused mass which by further treatment with a halogen at a lower temperature in presence of chlorosulfonic acid becomes a vat dye that dyes cotton in a hydrosulfite vat orange tints. The dyes are characterized by good properties of fastness.

The dyes of equally good properties and similar tint are obtained by the action of sulfur and halogen on decacyclene in chlorosulfonic acid in a single operation. Instead of halogen and sulfur there may be used agents, which, like sulfur chloride, act simultaneously to produce halogenation and sulfurization.

The following examples illustrate the invention, the parts being by weight:—

Example 1.—Into 350 parts of chlorosulfonic acid are introduced, whilst stirring and cooling to about 15 to 20° C., 45 parts of decacyclene and then 85 parts of sulfur chloride. In the course of about 3 hours the temperature is raised to 50° C. and maintained at that point for 4 to 5 hours. After cooling to room temperature the mass is poured on to ice, the product filtered and the solid matter washed with water. By boiling for 2 hours with 3 times its weight of crystallized sodium sulfide under reflux and stirring with water a part of the product is dissolved; the solution dyes cotton copper-brown tints of good fastness. The proportion which is insoluble in sodium sulfide may be vatted easily with hydrosulfite and the vat dyes cotton full orange tints of good fastness. The yield of vat dyes amounts to 60 parts.

Example 2.—100 parts of decacyclene and 400 parts of sulfur chloride are heated together in an oil bath under reflux and whilst stirring to 200° C. (oil bath temperature). The mixture, which at first is a dark red solution becomes highly viscous and then is further baked at 270 to 280° C. for about 8 hours for completing the formation of the dye.

50 parts of this crude dye are suspended in 300 parts of chlorosulfonic acid while gradually raising the temperature to 90° C. in the course of about 5 hours. 75 parts of chlorine is passed into the mass. After subsequently stirring for about an hour at the same temperature and then cooling the mass is poured on to ice, the solid matter filtered and washed. The product thus obtained dissolves only in traces when boiled with sodium sulfide. It can be vatted with caustic soda lye and hydrosulfite and the vat dyes cotton clear orange tints similar to those referred to in Example 1. The yield of vat dye amounts to 59 parts.

Example 3.—Into 400 parts of chlorosulfonic acid there are introduced, whilst cooling to about 20° C. and stirring, 50 parts of decacyclene and then 45 parts of sulfur. The temperature is raised in the course of 3 hours to 50° C. and maintained at this point for about another 3 hours during which time about 60 parts of chlorine are gradually introduced whilst stirring. When cool the mass is poured upon ice and the solid matter filtered and washed. This product is not soluble in sodium sulfide but it dissolves in a hydrosulfite vat and the latter then dyes cotton a fast orange tint. The yield of vat dye amounts to 110 parts.

Similar vat dyes are obtainable by halogenation of sulfur dyes made from hydroxydecacyclene or decacyclene sulfonic acids.

In our copending application Serial No. 57,364 we have disclosed a process for manufacturing sulfur dyes by heating decacyclene with a sulfurizing agent. In contradistinction thereto, our present invention relates to a process for manufacturing vat dyes which are insoluble in alkali metal sulfides but may be vatted with the aid of hydrosulfite. These differentiated products are obtained by not only sulfurizing decacyclene, but by a further chlorination and treatment in the presence of chlorosulfonic acid.

What we claim is:—

1. The process which comprises sulfurizing and halogenizing decacyclene in the presence of chlorosulfonic acid.

2. The process which comprises simultaneously sulfurizing and halogenizing decacyclene in the presence of chlorosulfonic acid.

3. The process which comprises sulfurizing and halogenizing decacyclene successively in the presence of chlorosulfonic acid.

4. The process which comprises sulfurizing and chlorinating decacyclene with sulfur chloride at a temperature between about 15 to about 50° C. in the presence of chlorosulfonic acid.

5. The process which comprises sulfurizing decacyclene at a temperature up to about 280° C., after cooling suspending the sulfur dye formed in chlorosulfonic acid, warming the mixture up to about 90° C. and passing chlorine into the mass.

6. The process which comprises introducing decacyclene and sulfur into chlorosulfonic acid, warming the mixture to 50° C. and introducing chlorine into the mass.

7. Vat-dyes being difficultly soluble in a sodium sulfide solution but being easily vatted with hydrosulfite and dyeing cotton from this vat full orange tints of good fastness, these dyes being obtainable according to the process claimed in claim 1.

WALTER HAGGE.
KARL HAAGEN.